(12) United States Patent
Hannuksela

(10) Patent No.: US 11,140,417 B2
(45) Date of Patent: Oct. 5, 2021

(54) APPARATUS, A METHOD AND A COMPUTER PROGRAM FOR VIDEO CODING AND DECODING

(71) Applicant: Nokia Technologies Oy, Espoo (FI)

(72) Inventor: Miska Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/343,596

(22) PCT Filed: Oct. 30, 2017

(86) PCT No.: PCT/FI2017/050747
§ 371 (c)(1),
(2) Date: Apr. 19, 2019

(87) PCT Pub. No.: WO2018/083378
PCT Pub. Date: May 11, 2018

(65) Prior Publication Data
US 2020/0053392 A1 Feb. 13, 2020

(30) Foreign Application Priority Data
Nov. 1, 2016 (FI) ........................................ 20165819

(51) Int. Cl.
*H04N 19/577* (2014.01)
*H04N 19/70* (2014.01)
(Continued)

(52) U.S. Cl.
CPC ............. *H04N 19/70* (2014.11); *H04N 19/30* (2014.11); *H04N 19/46* (2014.11); *H04N 19/597* (2014.11); *H04N 19/61* (2014.11)

(58) Field of Classification Search
CPC ........ H04N 19/70; H04N 19/30; H04N 19/46; H04N 19/597; H04N 19/61
(Continued)

(56) References Cited

U.S. PATENT DOCUMENTS

2014/0301464 A1   10/2014   Wu et al.
2015/0016504 A1   1/2015   Auyeung et al.
(Continued)

FOREIGN PATENT DOCUMENTS

EP   2490179 A1   8/2012
GB   2 522 014 A   7/2015
(Continued)

OTHER PUBLICATIONS

Sreedhar et al., "Viewport-Adaptive Encoding and Streaming of 360-Degree Video for Virtual Reality Applications", IEEE International Symposium on Multimedia (ISM), Dec. 11-13, 2016, 7 pages.
(Continued)

*Primary Examiner* — Nguyen T Truong
(74) *Attorney, Agent, or Firm* — Alston & Bird LLP

(57) ABSTRACT

The invention relates to video coding and decoding. A method comprises extracting a first spatial subset from coded pictures of a first bitstream into a second bitstream; extracting a second spatial subset from the coded pictures of the first bitstream into a third bitstream; generating a fourth bitstream by selecting and removing a first set of pictures from the third bitstream, wherein the selection is performed in a manner that the first set of pictures is not required for decoding any pictures of the fourth bitstream; decoding the second bitstream; and decoding the fourth bitstream.

15 Claims, 7 Drawing Sheets

(51) Int. Cl.
   *H04N 19/30* (2014.01)
   *H04N 19/46* (2014.01)
   *H04N 19/597* (2014.01)
   *H04N 19/61* (2014.01)
(58) Field of Classification Search
   USPC .................................................. 375/240.12
   See application file for complete search history.

(56) References Cited

U.S. PATENT DOCUMENTS

| | | | |
|---|---|---|---|
| 2015/0271507 A1 | 9/2015 | Hendry et al. | |
| 2016/0191926 A1 | 6/2016 | Deshpande et al. | |
| 2017/0134742 A1* | 5/2017 | Deshpande | H04N 19/30 |

FOREIGN PATENT DOCUMENTS

| | | |
|---|---|---|
| WO | WO 2014/006863 A1 | 1/2014 |
| WO | WO 2015/009676 A1 | 1/2015 |
| WO | WO 2016/098056 A1 | 6/2015 |
| WO | WO 2015/125494 A1 | 8/2015 |
| WO | WO 2015/194183 A1 | 12/2015 |
| WO | 2017/140945 A1 | 8/2017 |
| WO | 2017/203098 A1 | 11/2017 |

OTHER PUBLICATIONS

"Next-Generation Video Encoding Technique for 360 Video and VR", Facebook Code, Mar. 18, 2018, Webpage available at : https://codefacebook.com/posts/1126354007399553/next-generation-video-encoding-techniques-for-360-video-and-vr.
Wang et al., "RTP Payload Format for High Efficiency Video Coding (HEVC)", RFC 7798, Internet Engineering Task Force (IETF), Mar. 2016, pp. 1-86.
"Information Technology—Coding of Audio-Visual Objects—Part 15: Advanced Video Coding (AVC) File Format", ISO/IEC 14496-15, First edition, Apr. 15, 2004, 29 pages.
Schulzrinne et al., "RTP: A Transport Protocol for Real-Time Applications", RFC 3550, Network Working Group, Jul. 2003, pp. 1-89.
"Information technology—Generic coding of moving pictures and associated audio information: Systems", Series H: Audiovisual and Multimedia Systems Infrastructure of audiovisual service—Transmission multiplexing and synchronization, Recommendation ITU-T H.222.0, Oct. 2014, 246 pages.
"Information Technology—Coding of Audio-Visual Objects—Part 12: ISO Base Media File Format", ISO/IEC 14496-12, Third edition, Oct. 15, 2008, 120 pages.
"Information Technology—Coding of Audio-Visual Objects—Part 14: MP4 File Format", ISO/IEC 14496-14, First edition, Nov. 15, 2003, 18 pages.
"3rd Generation Partnership Project; Technical Specification Group Services and System Aspects; Transparent end-to-end packet switched streaming service (PSS); 3GPP file format (3GP) (Release 13)", 3GPP TS 26.244 V13.4.1, Sep. 2016, pp. 1-67.
"Advanced Video Coding for Generic Audiovisual Services", Series H: Audiovisual and Multimedia Systems, Infrastructure of audiovisual services—Coding of moving video, Recommendation ITU-T H.264, Oct. 2016, 804 pages.

"High Efficiency Video Coding", Series H: Audiovisual and Multimedia Systems Infrastructure of audiovisual services—Coding of moving video, Recommendation ITU-T H.265, Oct. 2014, 540 pages.
Coban et al., "Support of Independent Sub-Pictures", Joint Collaborative Team on Video Coding (JCT-VC) of ITU-T SG 16 WP 3 and ISO/IEC JTC 1/SC 29/WG 11, JCTVC-I0356, 9th Meeting, Apr. 27-May 7, 2012, pp. 1-5.
"Parameter Values for Ultra-High Definition Television Systems for Production and International Programme Exchange", Recommendation ITU-R BT.2020, Oct. 2015, 8 pages.
"Parameter Values for the HDTV Standards for Production and International Programme Exchange", Recommendation ITU-R BT.709-6, Jun. 2015, 19 pages.
"3rd Generation Partnership Project; Technical Specification Group Services and System Aspects; Transparent end-to-end Packet-switched Streaming Service (PSS); Protocols and codecs (Release 9)", 3GPP TS 26.234 V9.10.0, Jun. 2013, pp. 1-189.
"Information technology—Dynamic adaptive streaming over HTTP (DASH)", Part 1: Media presentation description and segment formats, International Standard ISO/IEC 23009-1, Apr. 1, 2015, pp. 1-56.
Moats, "URN Syntax", RFC 2141, Network Working Group, May 1997, pp. 1-8.
Berners-Lee et al., "Uniform Resource Identifier (URI): Generic Syntax", RFC 3986, Network Working Group, Jan. 2005, pp. 1-61.
"Video Coding for Low Bit Rate Communication", Series H: Audiovisual and Multimedia Systems, Infrastructure of audiovisual services—Coding of moving video, Recommendation ITU-T H.263, Jan. 2005, 226 pages.
Office action received for corresponding Finnish Patent Application No. 20165819, dated Mar. 29, 2017, 11 pages.
Zare et al., "HEVC-compliant Tile-based Streaming of Panoramic Video for Virtual Reality Applications", Proceedings of the 24th ACM international conference on Multimedia, Oct. 15-19, 2016, pp. 601-605.
Wang et al., "Tile based VR Video Encoding and Decoding Schemes", Joint Collaborative Team on Video Coding (JCT-VC)of ITU-T SG 16 WP 3 and ISO/IEC JTC 1/SC 29/WG 11, JCTVC-X0077, 24th Meeting, May 26-Jun. 1, 2016, pp. 1-6.
Skupin et al., "On MCTS Extraction", Joint Collaborative Team on Video Coding (JCT-VC) of ITU-T SG 16 WP 3 and ISO/IEC JTC 1/SC 29/WG 11, JCTVC-Y0031, 25th Meeting, Oct. 14-21, 2016, pp. 1-5.
International Search Report and Written Opinion received for corresponding Patent Cooperation Treaty Application No. PCT/FI2017/050747, dated Mar. 1, 2018, 12 pages.
D'Acunto et al., "Using MPEG DASH SRD for Zoomable and Navigable Video", Proceedings of the 7th International Conference on Multimedia Systems, No. 34, May 10-13, 2016, 4 pages.
Information Technology—Generic Coding of Moving Pictures and Associated Audio Information: Systems, ISO/IEC 13818-1 (Dec. 1, 2000) 174 pages.
3GPP TS 26.234 V9.10.0, $3^{rd}$ Generation Partnership Project: Technical Specification Group Services and System Aspects; Transparent end-to-end Packet-switched Streaming Service (PSS); Protocols and codecs (Release 9) (Jun. 2013) 189 pages.
Extended European Search Report for Application No. 17867239.0 dated Apr. 22, 2020, 10 pages.

* cited by examiner

APPARATUS, A METHOD AND A COMPUTER PROGRAM FOR VIDEO CODING AND DECODING

RELATED APPLICATION

This application was originally filed as Patent Cooperation Treaty Application No. PCT/FI2017/050747 filed Oct. 30, 2017 which claims priority benefit to FI Patent Application No. 20165819, filed Nov. 1, 2016.

TECHNICAL FIELD

The present solution generally relates to an apparatus, a method and a computer program for video coding and decoding.

BACKGROUND

This section is intended to provide a background or context to the invention that is recited in the claims. The description herein may include concepts that could be pursued, but are not necessarily the ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

SUMMARY

Some embodiments provide a method for encoding and decoding video information. In some embodiments of the present invention there is provide a method, an apparatus and a computer program product for video coding.

According to a first aspect, there is provided a method comprising extracting a first spatial subset from coded pictures of a first bitstream into a second bitstream; extracting a second spatial subset from the coded pictures of the first bitstream into a third bitstream; generating a fourth bitstream by selecting and removing a first set of pictures from the third bitstream, wherein the selection is performed in a manner that the first set of pictures is not required for decoding any pictures of the fourth bitstream; decoding the second bitstream; and decoding the fourth bitstream.

According to an embodiment the first spatial subset is a first motion-constrained tile set and the second spatial subset is a second motion-constrained tile set.

According to an embodiment the method further comprises selecting the first set of pictures as a set of temporal sub-layers.

According to an embodiment the method further comprises selecting the first set of pictures as non-reference pictures of a highest temporal sub-layer.

According to an embodiment the method further comprises parsing a second decoding capacity requirement indication concerning the second bitstream; parsing a fourth decoding capacity requirement indication concerning the fourth bitstream; and determining, based on the second and fourth decoding capacity requirement indications, that a decoding capacity is determined sufficient and a second and a fourth decoder instance are used in parallel for decoding the second and the fourth bitstream, respectively.

According to an embodiment the first spatial subset comprises a displayed picture.

According to a second aspect, there is provided an apparatus comprising at least one processor, memory including computer program code, the memory and the computer program code configured to, with the at least one processor, cause the apparatus to perform at least the following: to extract a first spatial subset from coded pictures of a first bitstream into a second bitstream; to extract a second spatial subset from the coded pictures of the first bitstream into a third bitstream; to generate a fourth bitstream by selecting and removing a first set of pictures from the third bitstream, wherein the selection is performed in a manner that the first set of pictures is not required for decoding any pictures of the fourth bitstream; to decode the second bitstream; and to decode the fourth bitstream.

According to an embodiment the first spatial subset is a first motion-constrained tile set and the second spatial subset is a second motion-constrained tile set.

According to an embodiment the apparatus further comprises computer program code configured to cause the apparatus to select the first set of pictures as a set of temporal sub-layers.

According to an embodiment the apparatus further comprises computer program code configured to cause the apparatus to select the first set of pictures as non-reference pictures of a highest temporal sub-layer.

According to an embodiment the apparatus further comprises computer program code configured to cause the apparatus to parse a second decoding capacity requirement indication concerning the second bitstream; to parse a fourth decoding capacity requirement indication concerning the fourth bitstream; and to determine, based on the second and fourth decoding capacity requirement indications, that a decoding capacity is determined sufficient and a second and a fourth decoder instance are used in parallel for decoding the second and the fourth bitstream, respectively.

According to an embodiment the first spatial subset comprises a displayed picture.

According to a third aspect, there is provided an apparatus comprising means for extracting a first spatial subset from coded pictures of a first bitstream into a second bitstream; means for extracting a second spatial subset from the coded pictures of the first bitstream into a third bitstream; means for generating a fourth bitstream by selecting and removing a first set of pictures from the third bitstream, wherein the selection is performed in a manner that the first set of pictures is not required for decoding any pictures of the fourth bitstream; means for decoding the second bitstream; and means for decoding the fourth bitstream.

According to a third aspect, there is provided a computer program product embodied on a non-transitory computer readable medium, comprising computer program code configured to, when executed on at least one processor, cause an apparatus or a system to extract a first spatial subset from coded pictures of a first bitstream into a second bitstream; to extract a second spatial subset from the coded pictures of the first bitstream into a third bitstream; to generate a fourth bitstream by selecting and removing a first set of pictures from the third bitstream, wherein the selection is performed in a manner that the first set of pictures is not required for decoding any pictures of the fourth bitstream; to decode the second bitstream; and to decode the fourth bitstream.

According to an embodiment the first spatial subset is a first motion-constrained tile set and the second spatial subset is a second motion-constrained tile set.

According to an embodiment the computer program product further comprises computer program code configured to cause the apparatus or the system to select the first set of pictures as a set of temporal sub-layers.

According to an embodiment the computer program product further comprises computer program code configured to cause the apparatus or the system to select the first set of pictures as non-reference pictures of a highest temporal sub-layer.

According to an embodiment the computer program product further comprises computer program code configured to cause the apparatus or to system to parse a second decoding capacity requirement indication concerning the second bitstream; to parse a fourth decoding capacity requirement indication concerning the fourth bitstream; and to determine, based on the second and fourth decoding capacity requirement indications, that a decoding capacity is determined sufficient and a second and a fourth decoder instance are used in parallel for decoding the second and the fourth bitstream, respectively.

According to an embodiment the first spatial subset comprises a displayed picture.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of one video coding arrangement. In particularly embodiments of the invention will be described in the context of virtual reality (VR) video coding arrangement. It is to be noted, however, that the invention is not limited to this particular arrangement. In fact, the different embodiments have applications widely in any environment where improvement of non-scalable, scalable and/or multiview video coding is required. For example, the invention may be applicable to video coding systems like streaming systems, DVD players, digital television receivers, personal video recorders, systems and computer programs on person a computers, handheld computers and communication devices, as well as network elements such as transcoders and cloud computing arrangements where video data is handled.

Figure 2:
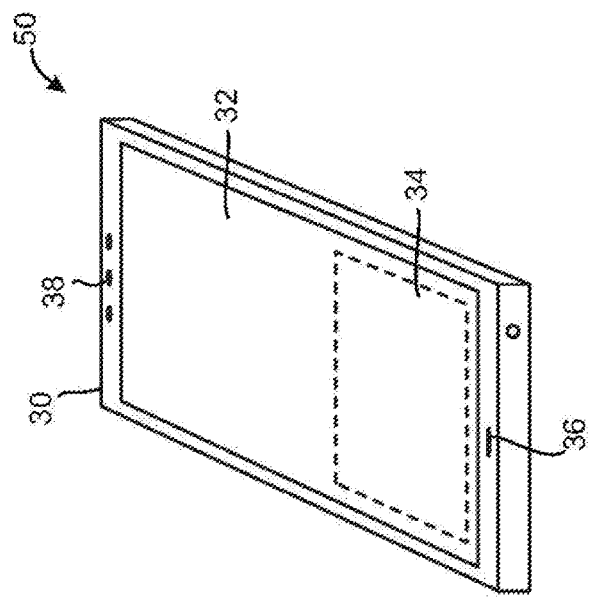
FIG. 2 shows a layout of an apparatus according to an embodiment.
Figure 1:
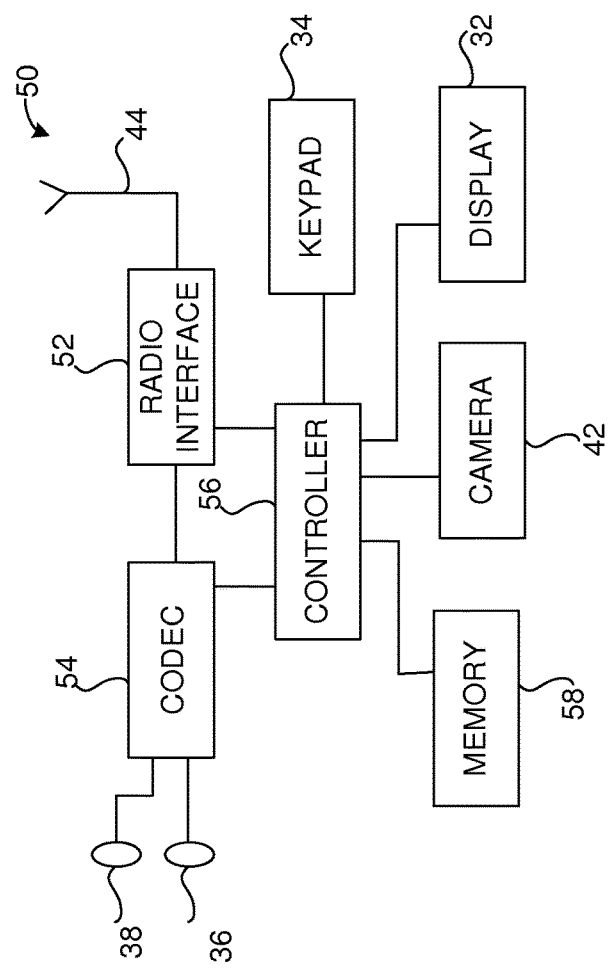
FIG. 1 shows a block diagram of a video coding system according to an embodiment.

The following describes in further detail suitable apparatus and possible mechanism for implementing some embodiments. In this regard, reference is first made to FIGS. 1 and 2, where FIG. 1 shows a block diagram of a video coding system according to example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding, or encoding or decoding video images.

The apparatus 50 may comprise a housing 30 for incorporating and protecting the device. The apparatus 50 may further comprise a display 32 in the form of a liquid crystal display. In other embodiments of the invention, the display may be any suitable display technology suitable to display an image or video. The apparatus 50 may further comprise a keypad 34. In other embodiments of the invention, any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise and audio output device, which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other device. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise a radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
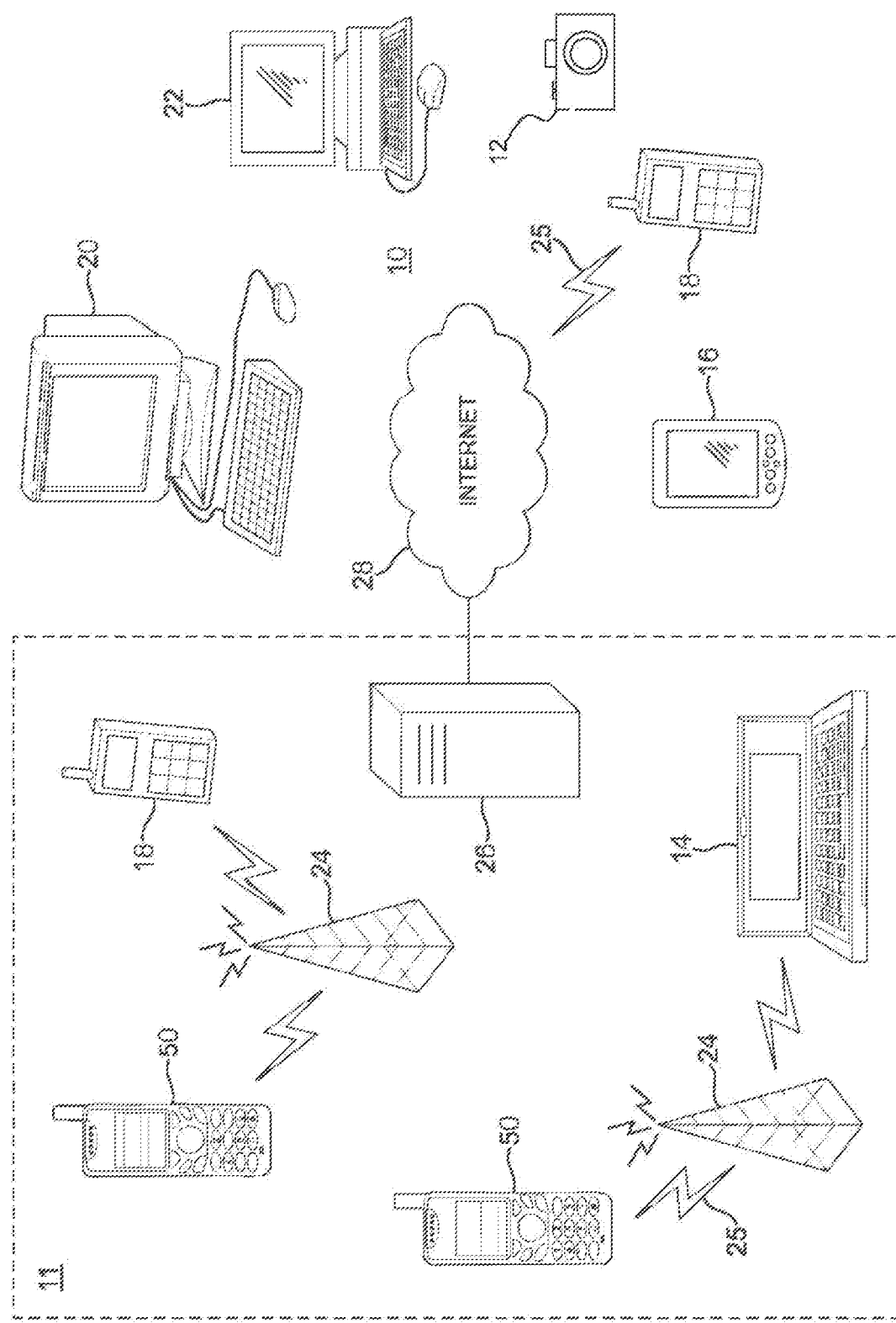
FIG. 3 shows an example of a system.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices or various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MSS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising a media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISOBMFF is the base for derivation of all the above mentioned file formats (excluding the ISOBMFF itself).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

One building block in the ISOBMFF is called a box. Each box may have a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISOBMFF may be considered to specify a hierarchical structure of boxes. Each box of the ISO base media file may be identified by a four-character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box.

According to the ISOBMFF, a file may include media data and metadata that may be enclosed in separate boxes. In an example embodiment, the media data may be provided in a media data (mdat) box and the movie (moov) box (a.k.a. MovieBox) may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISOBMFF). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected.

The 'trak' box contains a Sample Table box. The Sample Table box comprises e.g. all the time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding. The initialization information is sometimes referred to as or may comprise a decoder configuration record.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box. For the metadata of the movie fragments, however, a moof box (a.k.a. MovieFragmentBox) may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

A sample grouping in the ISOBMFF and its derivatives, such as the file format for NAL unit structured video (ISO/IEC 14496-15), may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping. The 'sbgp' and the 'sgpd' boxes may be linked using the value of grouping_type and, in some versions of the boxes, also the value of grouping_type_parameter. The 'sbgp' box indicates the index of the sample group description entry that a particular sample belongs to.

The Temporal Level sample grouping ('tele') specified in the ISO base media file format provides a codec-independent sample grouping that can be used to group samples (access units) in a track (and potential track fragments) according to temporal level, where samples of one temporal level have no coding dependencies on samples of higher temporal levels. The temporal level equals the sample group description index (taking values 1, 2, 3, etc.). The bitstream containing only the access units from the first temporal level to a higher temporal level remains conforming to the coding standard.

A temporal layer sample group entry, specified in ISO/IEC 14496-15 for HEVC, defines the temporal layer information for all samples in a temporal (sub-)layer. Temporal layers are numbered with non-negative integers, and each temporal layer is associated with a particular value of TemporalId as defined in HEVC. A temporal layer associated with a TemporalId value greater than 0 depends on all temporal layers associated with lower TemporalId values. A temporal layer representation, also referred to as the representation of a temporal layer, associated with a particular TemporalId value consists of all temporal layers associated with TemporalId values less than or equal to the given TemporalId value. The sample group entry also provides profile, tier, and level information for the associated temporal layer representation.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consist of an encoder that transforms the input video into a compressed representation suited for storage/transmission and a decoder that can uncompress the compressed video representation back into a viewable form. A video encoder and/or a video decoder may also be separate from each other, i.e. need not form a codec. The encoder may discard some information in the original video sequence in order to represent the video in a more compact form (that is, at lower bitrate). A video encoder may be used to encode an image sequence, as defined subsequently, and a video decoder may be used to decode a coded image sequence. A video encoder or an intra coding part of a video encoder or an image encoder may be used to encode an image, and a video decoder or an inter decoding part of a video decoder or an image decoder may be used to decoded a coded image.

Some hybrid video encoders, for example many encoder implementations of ITU-T H.263 and H.264, encode the video information in two phases. Firstly, pixel values in a certain picture are (or "block") are predicated for example by motion compensation means (finding and indicating an area in one of the previously coded video frames that correspond closely to the block being coded) or by spatial means (using the pixel values around the block to be coded in a specified manner). Secondly, the prediction error, i.e. the difference between the predicated block of pixels and the original block of pixels, is coded. This may be done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded picture (a.k.a. reference pictures). In intra block copy (a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

There may be different types of intra prediction modes available in a coding scheme, out of which an encoder can select and indicate the used one, e.g. on block or coding unit basis. A decoder may decode the indicated intra prediction mode and reconstruct the prediction block accordingly. For example, several angular intra prediction modes, each for different angular direction, may be available. Angular intra prediction may be considered to extrapolate the border samples of adjacent blocks along a linear prediction direction. Additionally or alternatively, a planar prediction mode may be available. Planar prediction may be considered to essentially form a prediction block, in which each sample of a prediction block may be specified to be an average of vertically aligned sample in the adjacent sample column on the left of the current block and the horizontally aligned sample in the adjacent sample line above the current block. Additionally or alternatively, a DC prediction mode may be available, in which the prediction block is an average sample value of a neighboring block or blocks.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
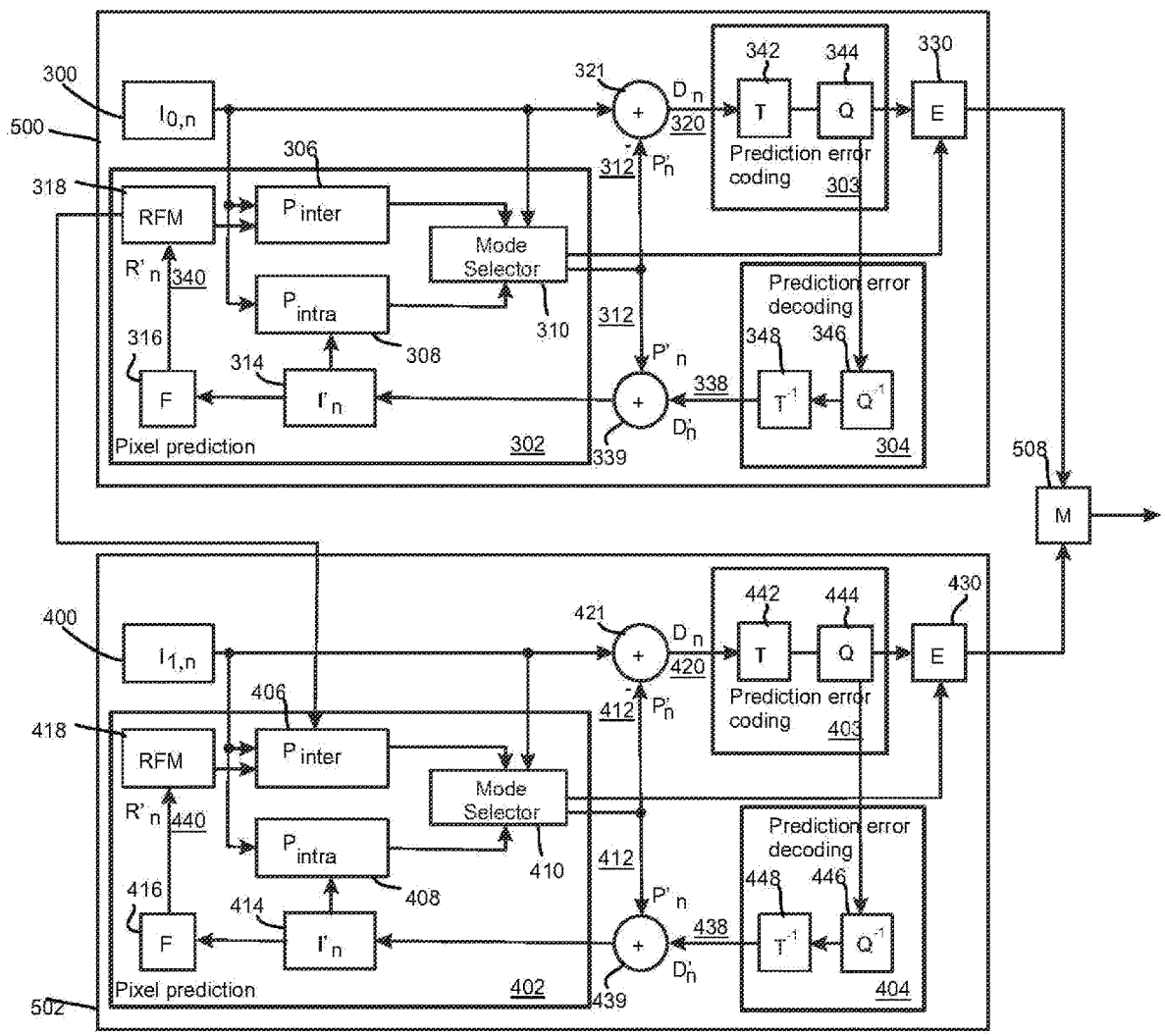
FIG. 4 shows a block diagram of a video encoder.

FIG. 4 shows a block diagram of a video encoder suitable for employing embodiments of the invention. FIG. 4 presents an encoder for two layers, but it would be appreciated that presented encoder could be similarly simplified to encode only one layer or extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, and intra-predictor 308, 408, a mode selector 310, 410, a filter 316, 416, and a reference frame memory 318, 418. The pixel predictor 302 of the first encoder section 500 receives base layer images 300 of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives enhancement layer images 400 of a video stream to be encoded at both the inter-prediction 406 (which determines the difference between the image and a motion compensated reference frame 418) and the intra-predictor 408 (which determines a prediction for an image block based only on the already processed parts of the current frame or picture). The output of both the inter-predictor and the intra-predictor are passed to the mode selector 410. The intra-predictor 408 may have more than one intra-prediction modes. Hence each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be save in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Unit (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was published as ITU-T Recommendation H.265 (10/2014). Further extensions to H.265/HEVC included three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics, e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles. A tier may be defined as specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

In some cases, a conformance point may be defined as a combination of a particular profile and a particular level or a combination of a particular profile, a particular tier, and a particular level. It needs to be understood that a conformance point may be defined in alternative ways, while its intent to specify characteristics and limits of bitstream and/or characteristics and (maximum) resources of decoders may be kept unchanged.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoder may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream, e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is an only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling, when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It may be signaled at CU level whether prediction error coding is applied or not for each CU. In the case there is no prediction error residual associated with the CU, it can be considered there are not TUs for the said CU. The division of the image into CUs, and division of CUs into PUs and TUs may be signaled in the bitstream allowing the decoder to reproduce the intended structure of these units.

HEVC enables the use of wavefront parallel processing (WPP), in which each CTU row of a slice can be encoded and decoded in parallel. When WPP is used, the state of the entropy codec at the beginning of a CTU row is obtained from the state of the entropy codec of the CTU row above after processing the second CTU of that row. Consequently, CTU rows can be processed in parallel with a delay of 2 CTUs per each CTU row.

In HEVC, a picture can be partitioned in tiles, which are rectangular and contain an integer number of LCUs. In HEVC, the partitioning to tiles forms a grid comprising one or more tile columns and one or more tile rows. A coded tile is byte-aligned, which may be achieved by adding byte-alignment bits at the end of the coded tile.

In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, CUs have a specific scan order.

In HEVC, a tile contains an integer number of coding tree units, and may consist of coding tree units contained in more than one slice. Similarly, a slice may consist of coding tree units contained in more than one tile. In HEVC, all coding tree units in a slice belong to the same tile and/or all coding tree units in a tile belong to the same slice. Furthermore, in HEVC, all coding tree units in a slice segment belong to the same tile and/or all coding tree units in a tile belong to the same slice segment.

A coding technique known as isolated regions is based on constraining in-picture prediction and inter prediction jointly. An isolated region in a picture can contain any macroblock (or alike) locations, and a picture can contain zero or more isolated regions that do not overlap. A leftover region, if any, is the area of the picture that is not covered by any isolated region of a picture. When coding an isolated region, at least some types of in-picture prediction is disabled across its boundaries. A leftover region may be predicted from isolated regions of the same picture.

A coded isolated region can be decoded without the presence of any other isolated or leftover region of the same coded picture. It may be necessary to decode all isolated regions of a picture before the leftover region. In some implementations, an isolated region or a leftover region contains at least one slice.

Pictures, whose isolated regions are predicted from each other, may be grouped into an isolated-region picture group. An isolated region can be inter-predicted from the corresponding isolated region in other pictures within the same isolated-region picture group, whereas inter prediction from other isolated regions or outside the isolated-region picture group may be disallowed. A leftover region may be inter-predicted from any isolated region. The shape, location, and size of coupled isolated regions may evolve from picture to picture in an isolated-region picture group.

Coding of isolated regions in the H.264/AVC codec may be based on slice groups. The mapping of macroblock locations to slice groups may be specified in the picture parameter set. The H.264/AVC syntax includes syntax to code certain slice group patterns, which can be categorized into two types, static and evolving. The static slice groups stay unchanged as long as the picture parameter set is valid, whereas the evolving slice groups can change picture by picture according to the corresponding parameters in the picture parameter set and a slice group change cycle parameter in the slice header. The static slice group patterns include interleaved, checkerboard, rectangular oriented, and freeform. The evolving slice group patterns include horizontal wipe, vertical wipe, box-in, and box-out. The rectangular oriented pattern and the evolving patterns are especially suited for coding of isolated regions and are described more carefully in the following.

For a rectangular oriented slice group pattern, a desired number of rectangles are specified within the picture area. A foreground slice group includes the macroblock locations that are within the corresponding rectangle but excludes the macroblock locations that are already allocated by slice groups specified earlier. A leftover slice group contains the macroblocks that are not covered by the foreground slice groups.

An evolving slice group is specified by indicating the scan order of macroblock locations and the change rate of the size of the slice group in number of macroblocks per picture. Each coded picture is associated with a slice group change cycle parameter (conveyed in the slice header). The change cycle multiplied by the change rate indicates the number of macroblocks in the first slice group. The second slice group contains the rest of the macroblock locations.

In H.264/AVC, in-picture prediction is disabled across slice group boundaries, because slice group boundaries lie in slice boundaries. Therefore each slice group is an isolated region or leftover region.

Each slice group has an identification number within a picture. Encoders can restrict the motion vectors in a way that they only refer to the decoded macroblocks belonging to slice groups having the same identification number as the slice group to be encoded. Encoders should take into account the fact that a range of source samples is needed in fractional pixel interpolation and all the source samples should be within a particular slice group.

The H.264/AVC codec includes a deblocking loop filter. Loop filtering is applied to each 4×4 block boundary, but loop filtering can be turned off by the encoder at slice boundaries. If loop filtering is turned off at slice boundaries, perfect reconstruction at the decoder can be achieved when performing gradual random access. Otherwise, reconstructed pictures may be imperfect in content even after the recovery point.

The recovery point SEI message and the motion constrained slice group set SEI message of the H.264/AVC standard can be used to indicate that some slice groups are coded as isolated regions with restricted motion vectors. Decoders may utilize the information for example to achieve faster random access or to save in processing time by ignoring the leftover region.

A motion-constrained tile set is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set.

It is noted that sample locations used in inter prediction are saturated so that a location that would be outside the picture otherwise is saturated to point to the corresponding boundary sample of the picture. Hence, if a tile boundary is also a picture boundary, motion vectors may effectively cross that boundary or a motion vector may effectively cause fractional sample interpolation that would refer to a location outside that boundary, since the sample locations are saturated onto the boundary.

The temporal motion-constrained tile sets SEI message of HEVC can be used to indicate the presence of motion-constrained tile sets in the bitstream.

An inter-layer constrained tile set is such that the inter-layer prediction process is constrained in encoding such that no sample value outside each associated reference tile set, and no sample value at fractional sample position that is derived using one of more sample values outside each associated reference tile set, is used for inter-layer prediction of any sample within the inter-layer constrained tile set.

The inter-layer constrained tile sets SEI message of HEVC can be used to indicate the presence of inter-layer constrained tile sets in the bitstream.

A sub-picture concept has been proposed for HEVC e.g. in document JCTVC-10356<http://phenix.int-evry.fr/jct/doc_end_user/documents/9_Geneva/wg11/JCTVC-I0356-v1.zip>, which is similar to rectangular isolated regions or rectangular motion-constrained slice group sets of h.264/AVC. The sub-picture concept proposed in JCTVC-10356 is described in the following, while it should be understood that sub-pictures may be defined otherwise similarly but not identically to what is described below. In the sub-picture concept, the picture is partitioned into predefined rectangular regions. Each sub-picture would be processed as an independent picture except that all sub-pictures constituting a picture share the same global information such as SPS, PPS and reference picture sets. Sub-pictures are similar to tiles geometrically. Their properties are as follows: They are LCU-aligned rectangular regions specified at sequence level. Sub-pictures in a picture may be scanned in sub-picture raster scan of the picture. Each sub-picture starts a new slice. If multiple tiles are present in a picture, sub-picture boundaries and tiles boundaries may be aligned. There may be no loop filtering across sub-pictures. There may be no prediction of sample value and motion info outside the sub-picture, and no sample value at a fractional sample position that is derived using one or more sample values outside the sub-picture may be used to inter predict any sample within the sub-picture. If motion vectors point to regions outside of a sub-picture, a padding process defined for picture boundaries may be applied. LCUs are scanned in raster order within sub-pictures unless a sub-picture contains more than one tile. Tiles within a sub-picture are scanned in tile raster scan of the sub-picture. Tiles cannot cross sub-picture boundaries except for the default one tile per picture case. All coding mechanisms that are available at picture level are supported at sub-picture level.

Isolated regions, temporal motion-constrained tile sets, inter-layer constrained tile sets, and sub-pictures, as described above, are examples of spatial subsets that can be extracted from a coded picture or a bitstream and decoded independently of other parts of the coded picture or the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one or more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently, those may be coded differentially with respect to block specific predicted motion vectors. In typical video codecs, the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the choses candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enable by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in and image area:

$$C = D + \lambda R \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighbouring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A NAL unit may be defined as a syntax structure containing an indication of the type of data to follow and bytes containing that data in the form of an RBSP interspersed as necessary with startcode emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0. NAL units consist of a header and payload.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plues1 syntax element may be regarded as a temporal identifier for the NAL unit, and a zero-based TemporalId variable may be derived as follows: TemporalId=temporal_id_plus1−1. TemporalId equal to zero corresponds to the lower temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. In H.264/AVC, coded slice NAL units contain syntax elements representing one or more coded macroblocks, each of which corresponds to a block of samples in the uncompressed picture. In HEVC, VCL NAL units contain syntax elements representing one or more CU.

In HEVC, a coded slice NAL unit can be indicated to be one of the following types:

| nal_unit_type | Name of nal_unit_type | Content of NAL unit and RBSP syntax structure |
| --- | --- | --- |
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18, 19, 20 | BLA_W_LP IDR_W_RADL BLA_N_LP IDR_W_RADL IDR_N_LP | Coded slice segment of a BLA picture slice_segment_layer_rbsp( ) Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved // reserved RAP VCL NAL unit types |
| 24 . . . 31 | RSV_VCL24 . . . RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A IRAP picture in an independent layer does not refer to any pictures other than itself for inter prediction in its decoding process. When no intra block copy is in use, an IRAP picture in an independent layer contains only intra-coded slices. An IRAP picture belonging to a predicted layer with nuh_layer_id value currLayerId may contain P, B, and I slices, cannot use inter prediction from other picture with nuh_layer_id equal to currLayerId, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL picture at the independent layer in decoding order can be correctly decoded without performing the decoding process of any picture that precede the IRAP picture in decoding order. The IRAP picture belonging to a predicted layer with nuh_layer_id value currLayerId and all subsequent non-RASL pictures with nuh_layer_id equal to currLayerId in decoding order can be correctly decoded without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId). There may be pictures in a bitstream that contain only intra-coded slices that are not IRAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL picture, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_RADL, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of the RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_RADL or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with the CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these picture is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable upswitching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header. A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( ) syntax structure. The vps_extension( ) syntax structure was specified in HEVC version 2 primarily for multi-layer extensions and comprises syntax elements which may be of use for decoding of one or more non-base layers, such as syntax elements indicating layer dependency relations.

The syntax element max_tid_il_ref_pics_plus1 in the VPS extension can be used to indicate that non-IRAP pictures are not used a reference for inter-layer prediction and, if not so, which temporal sub-layers are not used as a reference for inter-layer prediction:

max_tid_il_ref_pics_plus1 [i][j] equal to 0 specifies that non-IRAP pictures with nuh_layer_id equal to layer_id_in_nuh[i] are not used as source pictures for inter-layer prediction for pictures with nuh_layer_id equal to layer_id_in_nuh[j].

max_tid_il_ref_pics_plus1 [i][j] greater than 0 specifies that pictures with nuh_layer_id equal to layer_id_in_nuh[i] and TemporalId greater than max_tid_il_ref_pics_plus1 [i][j]−1 are not used as source pictures for inter-layer prediction for pictures with nuh_layer_id equal to layer_id_in_nuh[j]. When not present, the value of max_tid_il_ref_pics_plus1 [i][j] is inferred to be equal to 7.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signalling or storage can additionally or alternatively be used for other purposes than tolerance against transmission errors, such as ease of access or session negotiation. For example, a sample entry of a track in a file conforming to the ISOBMFF may comprise parameter sets, while the coded data in the bitstream is stored elsewhere in the file or in another file. The phrase along the bitstream (e.g. indicating along the bitstream) may be used in claims and described embodiments to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

It may be required that coded pictures appear in certain order within an access unit. For example a coded picture with nuh_layer_id equal to nuhLayerIdA may be required to precede, in decoding order, all coded pictures with nuh_layer_id greater than nuhLayerIdA in the same access unit. An AU typically contains all the coded pictures that represent the same output time and/or capturing time.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A byte stream format has been specified in H.264/AVC and HEVC for transmission or storage environments that do not provide framing structures. The byte stream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the byte stream format is in use or not. The bit order for the byte stream format may be specified to start with the most significant bit (MSB) of the first byte, proceed to the least significant bit (LSB) of the first byte, followed by the MSB of the second byte, etc. The byte stream format may be considered to consist of a sequence of byte stream NAL unit syntax structures. Each byte stream NAL unit syntax structure may be considered to contain one start code prefix followed by one NAL unit syntax structure, i.e. the nal_unit (NumBytesInNalUnit) syntax structure if syntax element names are referred to. A byte stream NAL unit may also contain an additional zero_byte syntax element. It may also contain one or more additional trailing_zero_8bits syntax elements. When a byte stream NAL unit is the first byte stream NAL unit in the bitstream, it may also contain one or more additional leading_zero_8bits syntax elements. The syntax of a byte stream NAL unit may be specified as follows:

|  | Descriptor |
|---|---|
| byte_stream_nal_unit( NumBytesInNalUnit ) { | |
|    while( next_bits( 24 ) != 0x000001 && next_bits( 32 ) != 0x00000001 ) | |
|       leading_zero_8bits /* equal to 0x00 */ | f(8) |
|    if( next_bits( 24 ) != 0x000001 ) | |
|       zero_byte /* equal to 0x00 */ | f(8) |
|    start_code_prefix_one_3bytes /* equal to 0x000001 */ | f(24) |
|    nal_unit( NumBytesInNalUnit ) | |
|    while( more_data_in_byte_stream( ) && next_bits( 24 ) != 0x000001 && next_bits( 32 ) != 0x00000001 ) | |
|       trailing_zero_8bits /* equal to 0x00 */ | f(8) |
| } | |

The order of byte stream NAL units in the byte stream may be required to follow the decoding order of the NAL units contained in the byte stream NAL units. The semantics of syntax elements may be specified as follows. leading_zero_8bits is a byte equal to 0x00. The leading_zero_8bits syntax element can only be present in the first byte stream NAL unit of the bitstream, because any bytes equal to 0x00 that follow a NAL unit syntax structure and precede the four-byte sequence 0x00000001 (which is to be interpreted as a zero_byte followed by a start_code_prefix_one_3 bytes) will be considered to be trailing_zero_8bits syntax elements that are part of the preceding byte stream NAL unit. zero_byte is a single byte equal to 0x00. start_code_prefix_one_3 bytes is a fixed-value sequence of 3 bytes equal to 0x000001. This syntax element may be called a start code prefix (or simply a start code). trailing_zero_8bits is a byte equal to 0x00.

A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit.

The HEVC syntax of the nal_unit(NumBytesInNalUnit) syntax structure is provided next as an example of syntax of NAL unit.

| nal_unit( NumBytesInNalUnit ) { | Descriptor |
|---|---|
|    nal_unit_header( ) | |
|    NumBytesInRbsp = 0 | |
|    for( i = 2; i < NumBytesInNalUnit; i++ ) | |
|       if( i + 2 < NumBytesInNalUnit && next_bits( 24 ) = = 0x000003 ) { | |
|          rbsp_byte[ NumBytesInRbsp++ ] | b(8) |
|          rbsp_byte[ NumBytesInRbsp++ ] | b(8) |
|          i += 2 | |
|          emulation_prevention_three_byte /* equal to 0x03 */ | f(8) |
|       } else | |
|          rbsp_byte[ NumBytesInRbsp++ ] | b(8) |
| } | |

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal to HandleCraAsBlaFlag. NoRaslOutputFlag equal to 1 has an impact that the RASL pictures associated with the IRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

In HEVC, a reference picture set (RPS) syntax structure and decoding process are used. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighbouring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

A coding standard may include a sub-bitstream extraction process, and such is specified for example in HEVC. The sub-bitstream extraction process relates to converting a bitstream, typically by removing NAL units, to a sub-bitstream, which may also be referred to as a bitstream subset. The sub-bitstream still remains conforming to the standard. For example, in HEVC, the bitstream created by excluding all VCL NAL units having a TemporalId value greater than a selected value and including all other VCL NAL units remains conforming. In HEVC, the sub-bitstream extraction process takes a TemporalId and/or a list of nuh_layer_id values as input and derives a sub-bitstream (also known as a bitstream subset) by removing from the bitstream all NAL units with TemporalId greater than the input TemporalId value or nuh_layer_id value not among the values in the input list of nuh_layer_id values.

HEVC RTP payload is specified in IETF RFC 7798. Among other things, the RTP payload specifies the MIME type and optional MIME parameters for HEVC. dec-parallel-cap MIME parameter may be used to indicate the decoder's additional decoding capabilities given the presence of tools enabling parallel decoding, such as slices, tiles, and wavefront parallel processing (WPP), in the bitstream. The decoding capability of the decoder may vary with the setting of the parallel decoding tools present in the bitstream, e.g. the size of the tiles that are present in a bitstream. Therefore, multiple capability points may be provided, each indicating the minimum required decoding capability that is associated with a parallelism requirement, which is a requirement on the bitstream that enables parallel decoding. Each capability point is defined as a combination of 1) a parallelism requirement, 2) a profile (determined by profile-space and profile-id), 3) a highest level, and 4) a maximum processing rate, a maximum picture size, and a maximum video bitrate that may be equal to or greater than the determined by the highest level.

In frame-compatible stereoscopic video (a.k.a. frame packing of stereoscopic video), a spatial packing of a stereo pair into a single frame is performed at the encoder side as a pre-processing step for encoding and then the frame-packed frames are encoded with a known 2D video coding scheme. The output frames produced by the decoder contain constituent frames of a stereo pair.

In a typical operation mode, the spatial resolution of the original frames of each view and the packaged single frame have the same resolution. In this case the encoder downsamples the two views of the stereoscopic video before the packing operation. The spatial packing may use for example a side-by-side or top-bottom format, and the downsampling should be performed accordingly.

In ISO/IEC 14496-15 ("Carriage of network abstraction layer (NAL) unit structured video in the ISO base media file format"), the extractor NAL-unit-like structure is meant for extracting one or more entire NAL units from another track by reference into the track containing the extractor. An extractor NAL-unit-like structure may be specified to comprise constructors whose execution results into one or more entire NAL units. A NAL-unit-like structure may be specified to comprise a NAL unit header and NAL unit payload like any NAL units, but start code emulation prevention (that is required for a NAL unit) might not be followed in a NAL-unit-like structure.

When using extractors for HEVC, the extractor syntax contains one or more constructors. The following constructors are specified: a) A sample constructor extracts, by reference, NAL unit data from a sample of another track. b) An in-line constructor includes NAL unit data. The bytes of a sample constructor are copied only from the single identified sample in the track referenced through the indicated 'scal' track reference. The alignment is on decoding time, i.e. using the time-to-sample table only, followed by a counted offset in sample number.

A full-picture-compliant tile set {track|bitstream} is a tile set {track|bitstream} that conforms to the full-picture {track|bitstream} format. Here, the notation {optionA|optionB} illustrates alternatives, i.e. either optionA or optionB, which is selected consistently in all selections. A full-picture-compliant tile set track can be played as with any full-picture track using the parsing and decoding process of full-picture tracks. A full-picture-compliant bitstream can be decoded as with any full-picture bitstream using the decoding process of full-picture bitstreams. A full-picture track is a track representing an original bitstream (including all its tiles). A tile set bitstream is a bitstream that contains a tile set of an original bitstream but not representing the entire original bitstream. A tile set track is a track representing a tile set of an original bitstream but not representing the entire original bitstream.

A full-picture-compliant tile set track may comprise extractors as defined for HEVC. An extractor may for example an in-line constructor including a slice segment header and a sample constructor extracting coded video data for a tile set from a referenced full-picture track.

A pre-constructed tile set track is a tile set track containing the sample data in-line (rather than extracted by reference). A tile set track may be both pre-constructed and full-picture-compliant.

A tile track specified in ISO/IEC 14496-15 enables storage of one or more temporal motion-constrained tile set as a track. When a tile track contains tiles of an HEVC base layer, the sample entry type 'hvt1' is used. When a tile track contains tiles of a non-base layer, the sample entry type 'lht1' is used. A sample of a tile track consists of one or more complete tiles in one or more complete slice segments. A tile track is independent from any other tile track that includes VCL NAL units of the same layer as this tile track. A tile track has a 'tbas' track reference to a tile base track. The tile base track does not include VCL NAL units. A tile base track indicates the tile ordering using a 'sabt' track reference to the tile tracks. An HEVC coded picture corresponding to a sample in the tile base track can be reconstructed by collecting the coded data from the tile-aligned samples of the tracks indicated by the 'sabt' track reference in the order of the track references.

Internet media types, also known as MIME (Multipurpose Internet Mail Extension) types, are used by various applications to identify the type of a resource or a file. MIME types consist of a media type, a subtype, and zero or more optional parameters.

As described, MIME is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can indicate different media formats. Content type information may be included by a transmitting entity in a MIME header at the beginning of a media transmission. A receiving entity thus may need to examine the details of such media content to determine if the specific elements can be rendered given an available set of codecs. Especially, when the end system has limited resources, or the connection to the end systems has limited bandwidth, it may be helpful to know from the content type alone if the content can be rendered.

Two parameters, 'codecs' and 'profiles', are specified to be used with various MIME types or type/subtype combinations to allow for unambiguous specification of the codecs employed by the media formats contained within, or the profile(s) of the overall container format.

By labelling content with the specific codecs indicated to render the contained media, receiving systems can determine if the codecs are supported by the end system, and if not, can take appropriate action (such as rejecting the content, sending notification of the situation, transcoding the content to a supported type, fetching and installing the required codecs, further inspection to determine if it will be sufficient to support a subset of the indicated codecs, etc.). For file formats derived from the ISOBMFF, the codecs parameter may be considered to comprise a comma-separated list of one or more list items. When a list item of the codecs parameter represents a track of an ISOBMFF compliant file, the list item may comprise a four-character code of the sample entry of the track. A list item may additionally indicate the coding profile (e.g. HEVC Main profile) to which the bitstream contained by the samples of the track conform.

The profiles MIME parameter can provide an overall indication, to the receiver, of the specifications with which the content complies. This is an indication of the compatibility of the container format and its contents to some specification. The receiver may be able to work out the extent to which it can handle and render the content by examining to see which of the declared profiles it supports, and what they mean. The profiles parameter for an ISOBMFF file may be specified to comprise a list of the compatible brands included in the file.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Hypertext Transfer Protocol (HTTP) has been widely used for the delivery of real-time multimedia content over the Internet, such as in video streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, $2^{nd}$ Edition, 2014). MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the some embodiments may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In DASH, hierarchical data model is used to structure media presentation. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attribute as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camel-casing may be used after the first word, e.g. @veryImportantAttribute. Attributes may have assigned a status in the XML as mandatory (M), optional (O), optional with default value (OD) and conditionally mandatory (CM).

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

In DASH, an associated Representation may be defined as a Representation which provides supplemental or descriptive information for at least one other Representation. Associated Representations are described by a Representation element that contains an @associationId attribute and optionally an @associationType attribute. As opposed to complementary Representations, the segments of an associated Representation may be optional for decoding and/or presentation of the Representations identified by @associationId. They can be considered as supplementary or descriptive information, the type of the association being specified by the @associationType attribute. @associationId and @associationType attributes can only be used between Representations that are not in the same Adaptation Sets. @associationId specifies all Representations that the Representation containing the @associationId attribute is associated with in the decoding and/or presentation process as a whitespace-separated list of values of Representation@id attributes. @associationType specifies, as a whitespace separated list of values, the kind of association for each Representation the Representation has been associated with through the @associationId attribute. Values taken by this attribute are four-character codes for track reference types. When present, the @associationType attribute has as many values as the number of identifiers declared in the @associationId attribute.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

It may be required that for any dependent Representation X that depends on complementary Representation Y, the m-th Subsegment of X and the n-th Subsegment of Y shall be non-overlapping whenever m is not equal to n. It may be required that for dependent Representations the concatenation of the Initialization Segment with the sequence of Subsegments of the dependent Representations, each being preceded by the corresponding Subsegment of each of the complementary Representations in order as provided in the @dependencyId attribute shall represent a conforming Subsegment sequence conforming to the media format as specified in the @mimeType attribute for this dependent Representation.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

In DASH, all descriptor elements are typically structured in the same way, in that they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection. In this case, the horizontal coordinate may be considered equivalent to a longitude, and the vertical coordinate may be considered equivalent to latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

A panorama, such as an equirectangular panorama, can be stereoscopic. In a stereoscopic panorama format, one panorama picture may represent the left view and the other parorama picture (of the same time instant or access unit) may represent the right view. When a stereoscopic panorama is displayed on a stereoscopic display arrangement, such as a virtual reality headset, the left-view panorama may be displayed in appropriate viewing angle and field of view to the left eye, and the right-view panorama may be similarly displayed to the right eye. In a stereoscopic panorama, the stereoscopic viewing may be assumed to happen towards the equator (i.e. vertically the center-most pixel row) of the panorama, causing that greater the absolute inclination of the viewing angle, the worse the correctness of the stereoscopic three-dimensional presentation.

A family of pseudo-cylindrical projections attempts to minimize the distortion of the polar regions of the cylindrical projections, such as the equirectangular projection, by bending the meridians toward the center of the map as a function of longitude while maintaining the cylindrical characteristic of parallel parallels. Pseudo-cylindrical projections result into non-rectangular contiguous 2D images representing the projected sphere. However, it is possible to present pseudo-cylindrical projections in interrupted forms that are made by joining several regions with appropriate central meridians and false easting and clipping boundaries. Pseudo-cylindrical projections may be categorized based upon the shape of the meridians to sinusoidal, elliptical, parabolic, hyperbolic, rectilinear and miscellaneous pseudo-cylindrical projections. An additional characterization is based upon whether the meridians come to a point at the pole or are terminated along a straight line (in which case the projection represents less than 180 degrees vertically).

In cubemap projection format (a.k.a. cube map), spherical video is projected onto the six faces (a.k.a. sides) of a cube. The cubemap may be generated, for example, by first rendering the spherical scene six times from a viewpoint, with the views defined by a 90 degree view frustum representing each cube face. The cube sides may be frame-packed into the same frame or each cube side may be treated individually (in encoding, for example). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

A cubemap can be stereoscopic. A stereoscopic cubemap can e.g. be reached by re-projecting each view of a stereoscopic panorama to the cubemap format.

Terms 360-degree video or virtual reality (VR) video may be used interchangeably. They may generally refer to video content that provides such a large field of view that only a part of the video is displayed at a single point of time in typical displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a typical flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

As used herein the term "observation point" refers to a point or volume in a three-dimensional space for virtual reality audio/video acquisition or playback. An observation point is usually the same as the center point of a device or rig used for virtual reality audio/video acquisition as well as the position of the observer's head in the three-dimensional space in which the audio and video tracks are located. In some cases, an observation point might not correspond to a single center point of a capturing device or rig but a trajectory, such as a circle, a region, or a volume, for example. In some cases, an observer's head position is tracked and the rendering is adjusted for head movements in addition to head rotations, and then an observation point may be understood to be an initial or reference position of the observer's head.

As used herein, the term "projection" or "VR projection" refers to either a process by which a spherical image is projected onto a geometry, such as a planar surface or a cube, or the image frame resulting from the process. Examples of VR projections include equirectangular panorama and cubemap projections. In some contexts, the term projection may be understood to additionally comprise a mapping of a three-dimensional geometry, such as a cube map, onto one or more two-dimensional planes. Such mapping may comprise packing of a multitude of two-dimensional planes into the same frame (such as one two-dimensional plane, for example).

As used herein, the term "viewport" or "VR viewport" refers to a subset of an omnidirectional field of view. The term "viewport" may refer to a subset of the omnidirectional visual content currently being displayed for a user and/or a subset of the omnidirectional visual content that is coded with distinction (such as quality distinction or as a separable part, or a motion-constrained tile set, for example) from the remaining visual content. A distinction between these two definitions may be provided through a qualifier; such that the former may be referred to as a rendered viewport while the latter may be referred to as a coded viewport. In some cases a viewport may be represented by an orientation and a field of view, while in some other cases a viewport may be represented by an area, such as a rectangle, within a two-dimensional coordinate system for a particular projection format. An example of the latter is a rectangle within an equirectangular panorama image. A viewport may comprise several constituent viewports, which jointly form the viewport and may have different properties, such as picture quality.

As used herein, an "orientation" (such as an orientation of a viewport, for example) may be represented by angular coordinates of a coordinate system. Angular coordinates may, for example, be called yaw, pitch, and roll, indicating the rotation angles around certain coordinate axes, such as y, x and z, respectively. Yaw, pitch, and roll may be used, for example, to indicate an orientation of a viewport. In some contexts, viewport orientation may be constrained; for example, roll may be constrained to be 0. In some such examples, and in other examples, yaw and pitch indicate the Euler angle of the center point of the viewport in degrees. In most contexts, yaw is applied prior to pitch, such that yaw rotates around the Y-axis, and pitch around the X-axis. Likewise, in most contexts, the angles increase clockwise as viewed when looking away from the origin.

As used herein, the term "global coordinate system" may refer to a three-dimensional coordinate system as described that has an origin in an observation point.

A recent trend in streaming in order to reduce the streaming bitrate of VR video is the following: a subset of 360-degree video content covering the current view orientation is transmitted at the best quality/resolution, while the remaining of the 360-degree video is transmitted at a lower quality/resolution.

A projection structure may be defined as the three-dimensional structure consisting of one or more surface(s) on which the VR image/video content is projected. The projected frame may be defined as a two-dimensional frame on which the surface(s) of the projection structure are mapped. A projected frame may be alternatively or additionally defined as a frame that has a representation format that is defined by a VR projection format indicator. For example, the projection structure for a cube map projection is a cube, and a cube map is a two-dimensional projected frame formed by unfolding the cube faces. A VR projection format indicator may for example be an enumerated type indicating a representation format of a projected frame. For example, the indicator may indicate one of a monoscopic equirectangular panorama, a stereoscopic equirectangular panorama, a monoscopic cube map, and a stereoscopic cube map. When a stereoscopic projection format is indicated, a certain packing arrangement may be pre-defined or separately indicated. For example, a top-bottom packing arrangement may be pre-defined, where for example the left view may be defined to appear on top.

In some examples, several versions of VR video are encoded, each targeted for different viewing orientation. Consequently, the orientation of the projection structure, such as a sphere or a cube, is rotated according to the targeted viewing orientation. There may be different ways to indicate the orientation of the projection structure or the respected projected frame relative to a global coordinate system. For example, a primary point may be defined for the projection format, such as the center point in an equirectangular panorama picture or the center point of the front face of a cube map. Yaw and pitch may indicate the location of the primary point in the global coordinate system. The orientation of the projection structure or the corresponding projected frame may be indicated by roll, which indicated how a primary plane that is orthogonal to the reference direction is rotated.

In some implementations of DASH, the automated selection between Representations in the same Adaptation Set can be performed based on, for example, the width and height (which may be referenced as @width and @height, respectively); the frame rate (which may be referenced as @frameRate); the bitrate (which may be referenced as @bandwidth); and/or an indicated quality ordering between the Representations (which may be referenced as @qualityRanking). In some example implementations of DASH, the semantics of @qualityRanking are specified such that @qualityRanking specifies a quality ranking of the Representation relative to other Representations in the same Adaptation Set. Typically, lower values represent higher quality content. In an implementation of DASH, if an @qualityRanking attribute is not present, then no ranking is defined.

In the context of virtual reality video content, some viewports of the 360-degree content may be represented by better quality while other viewports may be represented by lower quality. However, it will be appreciated that none of the attributes discussed above is sufficient to make a distinction between 360-degree video that is coded for a different primary viewport.

In order to facilitate viewport-based adaptation in DASH, MPD may comprise metadata that indicates the primary viewport of a Representation. Moreover, in order to enable selection of Representations based on the picture quality of the primary viewport, the MPD may include means for indicating the quality for the primary viewport separately from the overall quality characteristics. One or more property descriptors or Elements may be used for indicating the primary viewport and/or quality for the primary viewport. Non-limiting examples of such are provided in the following paragraphs.

In an example, a VR video descriptor (VRD) serves two purposes: 1) It indicates which viewports are present in a (Sub)Representation. 2) It indicates viewport-specific quality ranking. The following pieces of information are conveyed in the VR video descriptor: the viewport(s) represented by the content, the projection format for the viewport(s), indication whether content for the viewport(s) is monoscopic or stereoscopic, and in the case of stereoscopic content if the left or right or both views are present, quality ranking value(s) for the viewport(s). Viewport-specific quality ranking information enables clients to make a distinction between Representations and Sub-Representations representing the same viewport(s) but with different qualities. The @value of the SupplementalProperty or EssentialProperty elements using the VRD scheme is a comma separated list of values for VRD parameters specified in the following table:

| EssentialProperty@value or SupplementalProperty@value parameter | Use | Description |
| --- | --- | --- |
| vr_source_id | M | non-negative integer in decimal representation providing the identifier for the source of the content |
| view_idc | M | 0 indicates that the viewport is monoscopic, 1 indicates that the viewport is the left view of stereoscopic content, 2 indicates that the viewport is the right view of stereoscopic content, 3 indicates that the viewport contains both the left and right views. Other values are reserved. |

-continued

| EssentialProperty@value or SupplementalProperty@value parameter | Use | Description |
| --- | --- | --- |
| projection_format | M | specifies the projection format of the viewport, as specified in [CICP] |
| viewport_yaw | M | decimal floating point value specifying the yaw of the center point of the viewport or string "NA" indicating that the viewport covers the remaining field of view not covered by the other VRD SupplementalProperty or EssentialProperty elements in the same containing element. |
| viewport_pitch | M | decimal floating point value specifying the pitch of the center point of the viewport or string "NA". When viewport_yaw is equal to NA, viewport_pitch shall be equal to NA. |
| viewport_hor_fov | M | decimal floating point value specifying the horizontal field of view of the viewport or string "NA". When viewport_yaw is equal to NA, viewport_hor_fov shall be equal to NA. |
| viewport_ver_fov | M | decimal floating point value specifying the vertical field of view or string "NA". When viewport_yaw is equal to NA, viewport_ver_fov shall be equal to NA. |
| quality_ranking | O | specifies a quality ranking of the viewport relative to other Representations (with associated @qualityRanking) in the same Adaptation Set and viewports with the same vr_source_id value in any Adaptation Set. Lower values represent higher quality content. If not present then no ranking is defined. |

Legend:
M = Mandatory,
O = Optional

In an example, the projection and mapping metadata in a file (e.g. compliant with ISO base media file format) and/or in the VR-specific descriptors of MPD includes one or more of the following: i) the VR projection format of the projected frame, ii) the orientation of the geometric structure corresponding to the projected frame in the global coordinate system, iii) region-wise mapping information, iv) region-wise quality ranking.

In an example, a virtual reality video descriptor (VRD) is specified as follows. The VRD scheme uses SupplementalProperty and/or EssentialProperty descriptors with a particular @schemeIdUri value. An EssentialProperty descriptor should be used when displaying the decoded video content on a conventional two-dimensional display. VR video SupplementalProperty or EssentialProperty descriptors may be present in AdaptationSet, Representation, or SubRepresentation. The @value of the SupplementalProperty or EssentialProperty elements using the VRD scheme is a comma separated list of values for VRD parameters specified in the following table:

| EssentialProperty@value or SupplementalProperty@value parameter | Use | Description |
|---|---|---|
| vr_source_id | M | specifies the identifier for the source of the content. The coordinate system is identical in all Representations associated with the same vr_source_id value. |
| projection_format | M | VR projection format indicator, specifies the projection format of the projected frame |
| global_yaw | M | decimal floating point value specifying the yaw of the projection in degrees relative to the global coordinate system |
| global_pitch | M | decimal floating point value specifying the pitch of the projection in degrees relative to the global coordinate system |
| global_roll | M | decimal floating point value specifying the roll of the projection in degrees relative to the global coordinate system |

Legend:
M = Mandatory,
O = Optional

In an example, the SRD descriptor is extended as follows: SRD descriptors are allowed also in Representation level. Many SRD descriptors are allowed in the same Representation and SubRepresentation element. Multiple SRD descriptors in the same container element are useful for example when SRD descriptors are used to indicate several regions within the projected frame and at least some of the regions are indicated to have a different quality ranking compared to others. The syntax and semantics of the SRD descriptor may be like described above. However, object_x, object_y, object_width, and object_height may be defined to be optional if there is another SRD descriptor in the same container element with the values being present. If object_x, object_y, object_width, and object_height are absent, the respective region is defined as the projected frame excluding the other specified regions in the same level. A quality_ranking parameter may be defined in the SRD, e.g. as a last parameter, as follows:

| quality_ranking | O | specifies a quality ranking of the region relative to other Representations (with associated @qualityRanking) in the same Adaptation Set and (Sub)Representations with the same vr_source_id value in any Adaptation Set. Lower values represent higher quality content. If not present then no ranking is defined. |
|---|---|---|

Many, but not all devices and operating systems support multiple parallel video decoder instances. In operating systems that support multiple processes and threads, parallel software decoding can usually be realized. In many handheld devices, parallel video decoding may be realized with hardware-accelerated decoding. In such devices, parallel decoding can improve the processing capacity (in terms of samples/second) when compared to using a single decoder instance.

Virtual reality video content has high spatial resolution. For example, equirectangular panoramas with about 4K (e.g. 3840×1920) spatial resolution per view is often used. Consumption of VR video content with HMDs might also benefit from a high picture rate, e.g. 50 or 75 Hz. Such high spatial and temporal resolutions are very demanding for real-time video decoding. Moreover, video decoding at high spatial resolution and frame rate causes relatively high battery consumption in battery-powered device, in turn causing a reduced batter life-time and/or over-heating. It is therefore important to reduce the decoding capacity requirements (computation, memory use, and memory access requirements).

The present embodiments relate to a solution for reducing decoding capacity requirements. The present embodiments are suitable for circumstances where a spatial subset of video is displayed at a single point of time. For example, the present embodiments suit for consumption of VR video on a HMD or on a 2D display.

Figure 5:
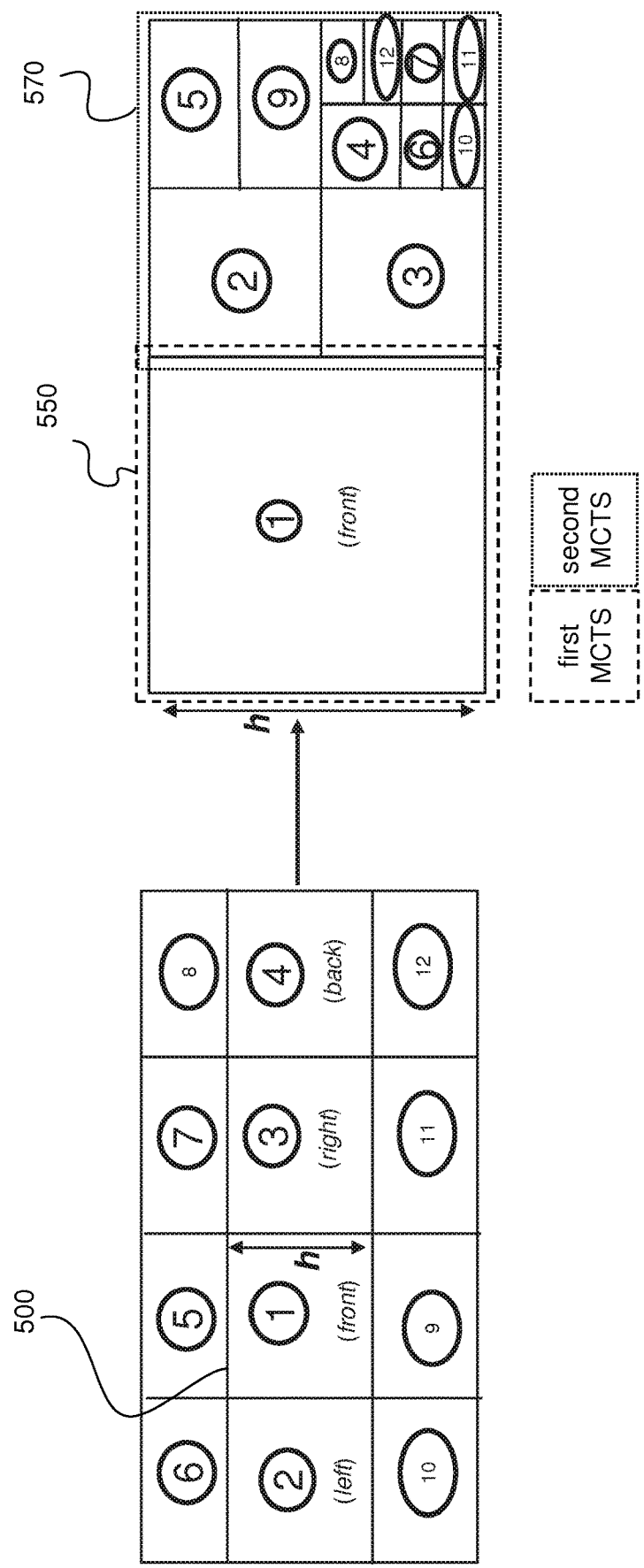
FIG. 5 shows an example of multi-resolution equirectangular panorama and its motion-constrained tile sets (MCTSs)

According to an embodiment, a video content is encoded into a first bitstream. The encoding is performed in a manner that the coded pictures comprise a first motion-constrained tile set (MCTS) and a second MCTS. Moreover, the encoding is performed in a temporally hierarchical or scalable manner, e.g. more than one temporal sub-layer is formed into the first bitstream. The video content may for example comprise a multi-resolution mapping of equirectangular panorama pictures, as illustrated in FIG. 5. In another example, the video content comprises a sequence of monoscopic 360-degree pictures, such as a sequence of monoscopic equirectangular panorama pictures.

According to an embodiment, a video content is encoded into a second bitstream and a third bitstream. For example, the same original panorama video clip may be encoded using a first picture quality or bitrate into the second bitstream and using a second picture quality or bitrate into the third bitstream. The encoding is performed in a manner that the coded pictures comprise motion-constrained tile sets. Moreover, the encoding is performed in a temporally hierarchical or scalable manner, e.g. more than one temporal sub-layer is formed into the first bitstream. A first bitstream is formed from a first MCTS and a second MCTS, wherein the first MCTS is obtained from a second bitstream and the second MCTS is obtained from a third bitstream. For example, the first MCTS may be non-overlapping with the second MCTS.

In an embodiment, a player, a streaming client, or alike has an access to multiple bitstreams with a different orientation of the primary viewport (covered by the first MCTS) out of which the player selects the first bitstream. For example, multiple Representations with different orientations of the primary viewport may be announced in a DASH MPD, and VR video descriptor or alike, e.g. as described above, may indicate the primary viewport of each Representation. The player may parse the VR video descriptor or alike from the DASH MPD and select the Representation to be streamed so that the primary viewport approximately or exactly matches the viewing orientation.

Figure 6:
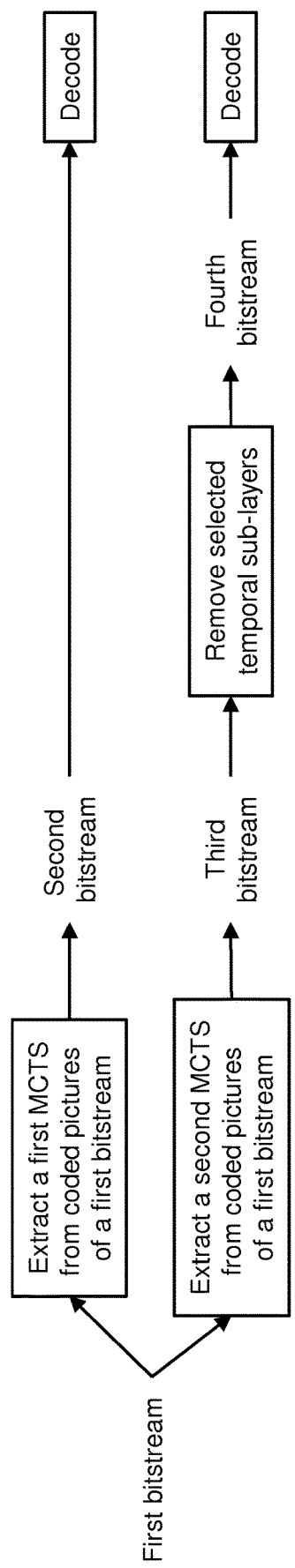
FIG. 6 shows an example of a decoding process.

In an embodiment, the first MCTS 550 covers the content 500 that is displayed, while the second MCTS 570 is needed only in the case the viewing orientation changes. The first bitstream is processed as follows in the player, the streaming client, or a alike. A second bitstream is formed by extracting the first MCTS 550 from the coded pictures of the first bitstream. A third bitstream is formed by extracting the second MCTS 570 from the coded pictures of the first bitstream. In order to reduce the decoding requirements (in terms of computations, memory use, and memory access) selected temporal sub-layers are removed from the third bitstream to form a fourth bitstream. The second bitstream and the fourth bitstream are decoded with separate decoder instances. The process is illustrated in FIG. 6.

Figure 7:
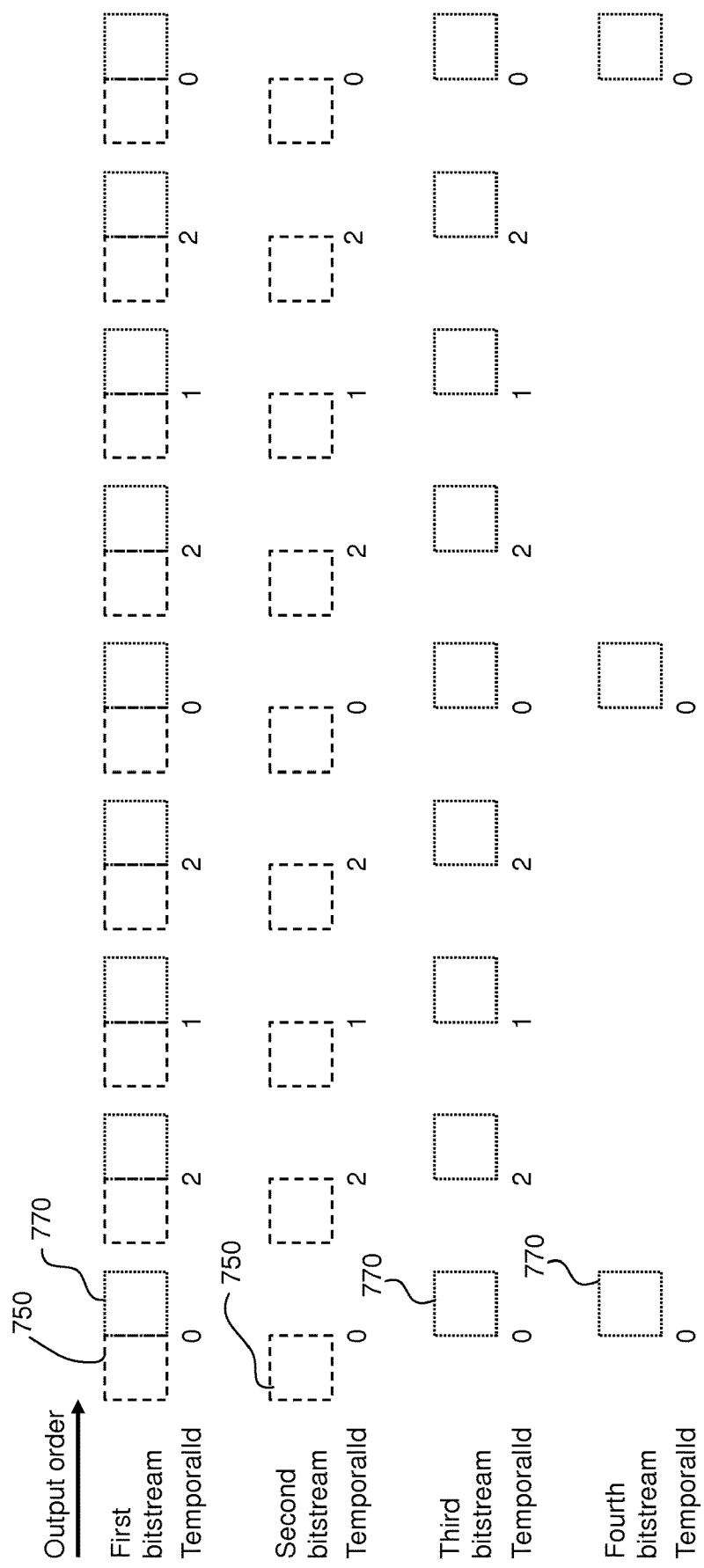
FIG. 7 shows an example of bitstreams where three temporal sub-layers are used in a hierarchical manner.

The amount of reduced decoding requirements depends on the share of pictures that are removed from the third bitstream as well as the share between the spatial extents of the first MCTS and the second MCTS. FIG. 7 illustrates a case where three temporal sub-layers (TemporalId 0, 1, 2) are used in a hierarchical manner, sub-layers having TemporalId 1 and 2 are removed from the third bitstream to form the fourth bitstream, and the first MCTS 750 and the second MCTS 770 comprise an equal number of samples. In this case, the decoding requirements for one decoder instance are reduced by approximately 75% and the total decoding requirements for both decoder instances are reduced by approximately 37.5%.

A method according to an embodiment for encapsulating a first bitstream into a file or Segments is described next. The first bitstream is enclosed in a first track (e.g. of a file conforming to ISOBMFF). A first MCTS—which is an example of a first spatial subset—is extracted into a second track by reference (pointing to the first track). The extraction can be done e.g. by using extractors of ISO/IEC 14496-15, wherein an extractor may for example comprise an in-line constructor including a slice segment header and a sample constructor extracting coded video data for the first MCTS from a particular sample of the first track. Alternatively, the extraction can be done by using other extractors.

According to an embodiment, the second MCTS—which is an example of a second spatial subset—at a reduced picture rate is extracted into a fourth track by reference (pointing to the first track). The reduced picture rate may be the lowest sub-layer, or the reference pictures of the lowest sub-layer.

According to an embodiment, the second MCTS at a full picture rate is extracted into a third track by reference (pointing to the first track, and, optionally, to the fourth track).

According to an embodiment, the second MCTS at a full picture rate is extracted into a third track by reference (pointing to the first track), e.g. by using extractors. The metadata of the third track comprises information of a temporal subset or a sub-bitstream that provides a reduced picture rate. For example, the metadata may comprise the temporal layer sample grouping specified in ISO/IEC 14496-15 and/or the temporal level sample grouping specified in the ISO base media file format. These sample groups can be used to determine a sub-bitstream that provides a reduced picture rate.

A method according to an embodiment for encapsulating a first bitstream into a file or Segments is described next. A first MCTS—which is an example of a first spatial subset—is encapsulated into a second track. The second track may for example be a tile track, such as an 'hvt1' track of ISO/IEC 14496-15. In another example, the second track is a full-picture-compliant pre-constructed tile set track. In both cases, samples of the second track comprise the first MCTS and do not comprise the second MCTS. The second MCTS—which is an example of a second spatial subset—is encapsulated into a third track. The third track may for example be a tile track, such as an 'hvt1' track of ISO/IEC 14496-15. In another example, the third track is a full-picture-compliant pre-constructed tile set track. In both cases, samples of the third track comprise the second MCTS and do not comprise the first MCTS.

Continuing the embodiment of the previous paragraph, it is described how a first track may be formed. In an embodiment, when the second track and the third track are tile tracks, a first track may be formed as a tile base track with reference to the second track and the third track. When reconstructing access units from the tile base track, the first bitstream is obtained. In an embodiment, when the second track and the third track are full-picture-compliant pre-constructed tile set tracks, a first track may be formed, wherein the first track is a full-picture track and the first track may comprise extractors. An extractor may comprise in-line constructors e.g. to include slice segment headers and may comprise sample constructors to extract the first MCTS from the second track and the second MCTS from the third track.

Continuing the embodiment above, it is described how extraction of a temporal subset or a sub-bitstream of the third track is enabled. In an embodiment, the metadata of the third track comprises information of a temporal subset or a sub-bitstream that provides a reduced picture rate. For example, the metadata may comprise the temporal layer sample grouping specified in ISO/IEC 14496-15 and/or the temporal level sample grouping specified in the ISO base media file format. These sample groups can be used to determine a sub-bitstream that provides a reduced picture rate. The reduced picture rate may be the lowest sub-layer, or the reference pictures of the lowest sub-layer. In an embodiment, a fourth track is formed by extracting data from the third track, e.g. using extractors. In other words, samples of the fourth track may include extractors, where an extractor extracts data by reference from the third track, including data that provides a reduced picture rate (e.g. the lowest sub-layer) and excluding data that is not in the temporal subset or sub-bitstream.

According to various embodiments, the second, the third and the fourth tracks enclose the second, the third and the fourth bitstreams respectively.

According to an embodiment, the second track is parsed to extract the first MCTS from coded pictures of a first bitstream into a second bitstream; the fourth track is parsed to extract the second MCTS from the coded pictures of the first bitstream into third bitstream and to generate a fourth bitstream by selecting and removing a first set of pictures from the third bitstream. The second and fourth bitstreams are decoded using separate decoder instances.

According to an embodiment, a second decoder configuration record (or alike) comprising a profile, a tier, and a level (or alike information) concerning the second track is parsed and treated as the second decoding capacity requirement indication concerning the second bitstream; a fourth decoder configuration record (or alike) comprising a profile, a tier, and a level (or alike information) concerning the fourth track parsing a fourth decoding capacity requirement indication concerning the fourth bitstream. Based on the second and fourth decoding capacity requirement indications, it is determined that a decoding capacity is determined to be sufficient, and a second and a fourth decoder instances are used in parallel for decoding the second and the fourth bitstream, respectively.

DASH Encapsulation and Signalling

According to an embodiment, DASH MPD or alike comprises one or more attributes indicating the decoding capacity requirements for parallel decoding. The attributes may indicate, for example, how many parallel decoder instances can be used and which profile, tier, and/or level (or alike information) are required from each decoder instance. For example, an attribute @parallelDecoding may be included in the common structure for Adaptation Set, Representation and Sub-Representation attributes and elements. Zero or more @parallelDecoding attributes can be included in the same containing element. The value for @parallelDecoding attribute may for example be defined with a regular expression syntax In the regular expression syntax, where keywords in italics are considered variables that are resolved by replacing them with their values, ( ) indicates a string of one or more characters, * indicates the inclusion of the string enclosed within the preceding parentheses by 0 or more times, ? indicates the inclusion of the string enclosed within the preceding parentheses by 0 times or 1 time, and alphanumeric characters are included as such. The syntax may for example be the following: numDecoders,(profile, tier, level)*. numDecoders indicates the number of decoder instances, and the triplet profile, tier, level is present numDecoders times. Each triplet indicates a decoding capacity requirement for a decoder instance.

According to an embodiment, the attributes may identify spatial subsets, e.g. a value of mcts_id[i] syntax element of the temporal motion-constrained tile sets SEI message of HEVC, and the decoding capacity requirements are associated with the identified MCTS. For example, the syntax may be the following: numDecoders,(mctsId, profile, tier, level) *, where mctsId indicated the value of the mcts_id[i] syntax element of the temporal motion-constrained tile sets SEI message of HEVC or any similar identifier for the spatial subset.

According to an embodiment, DASH MPD or alike comprises one or more property descriptors indicating the decoding capacity requirements for parallel decoding. The property descriptor may comprise parameters (e.g. in the value of the @value attribute of the property descriptor) that may indicate, for example, how many parallel decoder instances can be used and which profile, tier, and/or level (or alike information) are required from each decoder instance, and may identify the spatial subset. The syntax for the parameters may for example be similar to what is described for @parallelDecoding attribute above.

According to an embodiment, a Representation for which the attributes (or alike) are indicated comprises several tracks as described above. For example, a Representation may comprise the first, second, and fourth track as described above, enabling the client either to parse, decode, and play the first track in a known manner or to parse, decode, and play the second track and the fourth track. The attributes may comprise a MIME type and MIME parameters for the second, third, and/or fourth track. For example, the codecs MIME parameter included in the attributes can comprise the profile, tier, and/or level (or alike information) for the second, third, and/or fourth track. According to an embodiment, the attributes may comprise track references from the second, third, and/or fourth track to the first track. For example, when extractors are used as described above, the attributes or alike may comprise the 'scal' track reference.

According to an embodiment, a second, third, and/or fourth track as described above may be encapsulated in a separate Representation from that of the first track. The codecs MIME parameter included in the attributes for the separate Representation can comprise the profile, tier, and/or level (or alike information) for the second, third, and/or fourth track. The separate Representation may be indicated to be for parallel decoding purpose in the DASH MPD or alike. For example, a property descriptor or an attribute may be used for indicating that a Representation is for parallel decoding purpose. Alternatively or additionally, the track reference from the separate Representation to the Representation comprising the first track may be indicated in the DASH MPD or alike, e.g. in the @associationType attribute or in another attribute indicating the dependency or reference type.

According to an embodiment, a decision whether to use a full picture rate (i.e. the third bitstream) or a reduced picture rate (i.e. the fourth bitstream) may be done on GOP basis. In such example, a GOP may be defined as a repetitive picture coding pattern and can be e.g. 4 or 8 pictures. Consequently, if content from the second MCTS is about to be displayed, the full frame rate can be achieved quickly. It is noted that usually some decoded pictures are buffered e.g. to reconstruct a correct output order from the decoding order of pictures.

Moreover, decoding faster than real-time may be possible. Due to these reasons, the switch from decoding the fourth bitstream to decoding the third bitstream may be unnoticeable or cause a negligible glitch in a picture rate.

According to an embodiment, the second bitstream and the third bitstream may be formed as part of content creation or content encoding. For example, the panorama content may be split into tile rectangles prior to encoding and the second bitstream and third bitstream comprise a first tile rectangle and a second tile rectangle, respectively.

It needs to be understood that while embodiments have been described with reference to second MCTS covering areas not being displayed, in some cases both the first and second MCTSs may cover areas being displayed in which case both may need to be decoded at full picture rate. In some cases, e.g. caused by significant head movement of the viewer, the second MCTS covers the areas being displayed rather than the first MCTS. Temporal sub-sampling of the second bitstream (containing the first MCTS) may be performed similarly to what is done for the third bitstream to generate the fourth bitstream. The temporally sub-sampled version of the second bitstream may then be decoded.

It needs to be understood that while embodiments have been described with reference to the first MCTS and the second MCTS, embodiments may similarly be realized with more than two MCTSs. For example, when stereoscopic content is frame-packed, two MCTSs may be encoded per each constituent frame. In an embodiment, the second track comprises a first MCTS of each constituent frame (i.e. two MCTSs in total), and the third track and the fourth track comprise a second MCTS of each constituent frame (i.e. two MCTSs in total). In other aspects, the embodiment follows other embodiments described above. In another embodiment, the second, third, and fourth track comprise MCTSs of either the left view or the right view only, while fifth, sixth, and seventh tracks are formed similarly, comprising MCTSs of the other view that is not covered by the second, third, and fourth track.

In the above, some embodiments have been described with reference to motion-constrained tile sets. It needs to be understood that embodiments can be similarly realized with any other types of spatial subsets, such as isolated regions.

Figure 8:
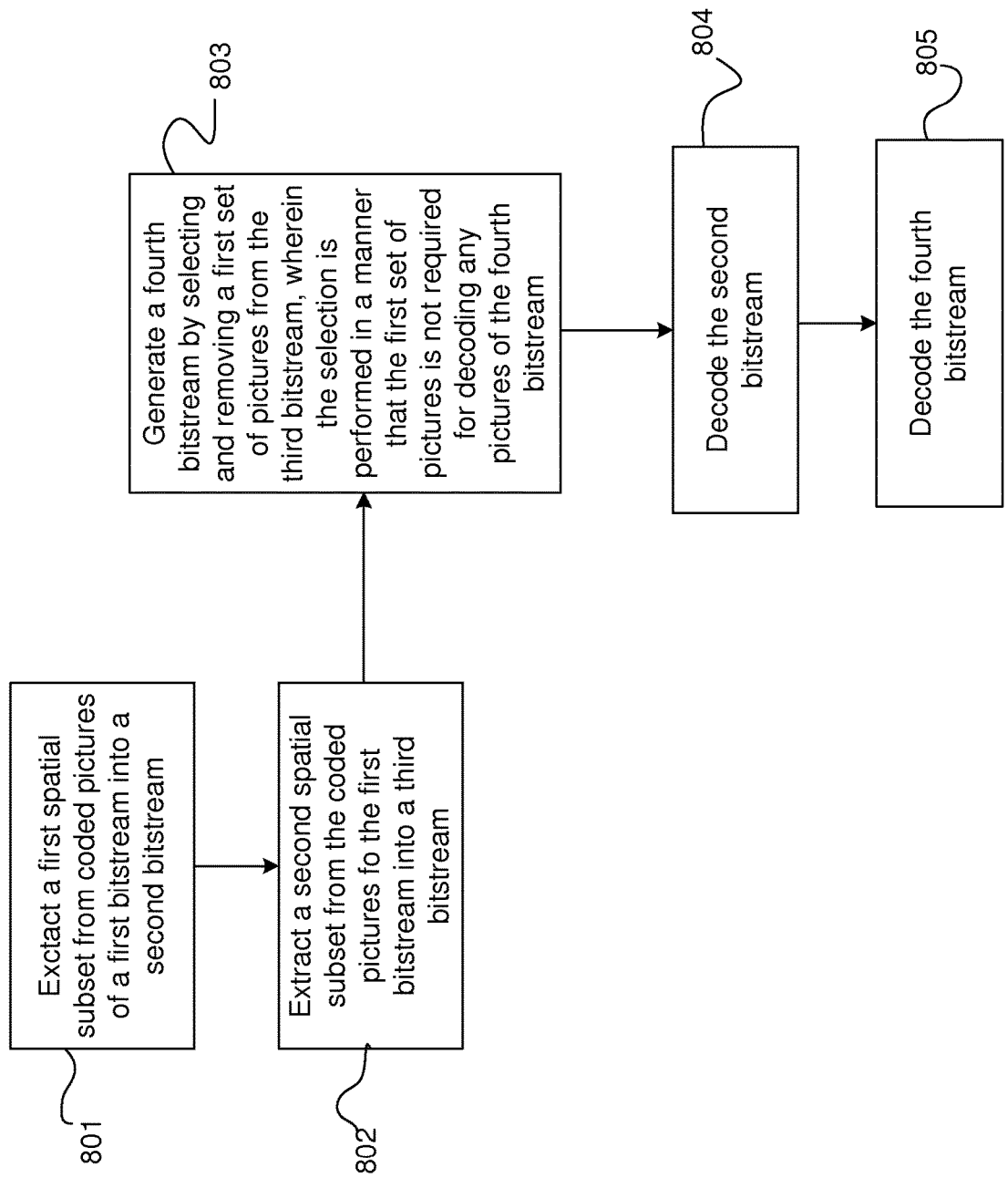
FIG. 8 is a flowchart of a method according to an embodiment.

FIG. 8 illustrates a method according to an embodiment. The method comprises extracting 801 a first spatial subset from coded pictures of a first bitstream into a second bitstream; extracting 802 a second spatial subset from the coded pictures of the first bitstream into a third bitstream; generating 803 a fourth bitstream by selecting and removing a first set of pictures from the third bitstream, wherein the selection is performed in a manner that the first set of pictures is not required for decoding any pictures of the fourth bitstream; decoding 804 the second bitstream; and decoding 805 the fourth bitstream.

An apparatus according to an embodiment comprises means for extracting a first spatial subset from coded pictures of a first bitstream into a second bitstream; means for extracting a second spatial subset from the coded pictures of the first bitstream into a third bitstream; means for generating a fourth bitstream by selecting and removing a first set of pictures from the third bitstream, wherein the selection is performed in a manner that the first set of pictures is not required for decoding any pictures of the fourth bitstream; means for decoding the second bitstream; and means for decoding 805 the fourth bitstream. The means of the apparatus comprises a processor, a memory, and a computer program code residing in the memory.

In the above, embodiments have been described in relation to forming a fourth bitstream or track by removing or omitting certain temporal sub-layers from the third bitstream or track. A sub-bitstream extraction process may be used in such removing or omitting. It needs to be understood that other means of forming a subset of the third bitstream or track may be used. In general, a picture or a set of pictures from which the remaining pictures are not dependent on may be removed or omitted from the fourth bitstream or track. It needs to be understood that there may be several means to obtain the fourth bitstream, e.g. based on the number of sub-layers included in the fourth bitstream. The player or the decoder or alike may select the means to be used e.g. based on the decoding capacity that can be dedicated for decoding the fourth bitstream. The player may for example select the number of sub-layers or temporal levels to be decoded, parse the temporal layer sample grouping specified in ISO/IEC 14496-15 and/or the temporal level sample grouping specified in the ISO base media file format if such are associated with the third bitstream (i.e. the third track), and based on the sample group(s) select the samples to be included in the fourth bitstream.

In the above, embodiments have been described in relation to forming a fourth bitstream or track by removing a first set of pictures from the third bitstream or track. It needs to be understood that embodiments can similarly be realized by selecting a second set of pictures to be included from the third bitstream or track to the fourth bitstream or track. For example, the second set of pictures may be determined to comprise certain sub-layers (e.g. TemporalId less than or equal to certain value). In another example, the second set of pictures may exclude non-reference pictures of the highest sub-layer.

In the above, embodiments have been described with reference to the third bitstream and/or track. It needs to be understood that embodiments can be similarly realized without forming the third bitstream or track, e.g. by directly referring (e.g. by extractors) to the first bitstream or track from the fourth bitstream or track.

Some embodiments have been described herein with reference to 360° video. As used herein, the term 360° video should be understood to cover any projection format. Moreover, while in some implementations, a 360° field of view is contemplated, example implementations may be used in connection with other fields of view, including but not limited to fields of view with coverage other than 360°, and may generally be less than that, without departing from the scope of the embodiments described herein.

In the above, some embodiments have been described in relation to ISOBMFF and/or formats derived from ISOBMFF. However, many example embodiments similarly apply to other file and segment formats, including but not limited to the Matroska file format.

In the above, some embodiments have been described in relation to MPEG-DASH or DASH. However, example implementations and embodiments similarly apply to other forms of streaming over HTTP, such as the Apple HTTP Live Streaming (HLS), for example. It should be understood that DASH-specific terminology in embodiments can be adjusted to similar terms in other streaming formats and systems.

In the above, some embodiments have been described in relation to Media Presentation Description (MPD) of MPEG-DASH. However, example implementations and embodiments similarly apply to other streaming manifest formats, such as the HLS M3U format, or other stream or presentation description formats, such as SDP (Session Description Protocol), for example.

In the above, some embodiments have been described by referring to the term streaming. However, example implementations and embodiments similarly apply to other forms of video transmission, such as progressive downloading, file delivery, and conversational video communications, such as video telephone, for example.

The various embodiments may provide advantages. For example, the present embodiments may reduce significantly decoding capacity requirements (computational, memory use, and memory access requirements) when video decoding is performed with multiple decoder instances. The present embodiments are suitable for virtual reality video content consumption with HMDs where only a subset of the video is displayed at a single point of time.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   selecting a first bitstream from a set of multiple bitstreams with different viewing orientations, the first bitstream comprising a first spatial subset of coded pictures of a video content and a second spatial subset of coded pictures of a video content;

extracting the first spatial subset from the coded pictures of the first bitstream to form a second bitstream, wherein the first spatial subset covers content for display;

extracting the second spatial subset from the coded pictures of the first bitstream to form a third bitstream, wherein the second spatial subset covers content for display with different viewing orientation than the first spatial subset;

generating a fourth bitstream by selecting and removing from the third bitstream a selected set of pictures, comprising one or more pictures, wherein the selection is performed in a manner that the selected set of pictures is not required for decoding pictures of the fourth bitstream, wherein selecting and removing the selected set of pictures is performed from a set of temporal sub-layers;

decoding the second bitstream for display; and decoding the fourth bitstream for display with different viewing orientation than the first spatial subset.

2. The method according to claim 1, wherein the first spatial subset is a first motion-constrained tile set and the second spatial subset is a second motion-constrained tile set.

3. The method according to claim 1 further comprising selecting the selected set of pictures as non-reference pictures of a highest temporal sub-layer.

4. The method according to claim 1, further comprising parsing a second indication concerning a decoding capacity requirement for the second bitstream;

parsing a fourth indication concerning a decoding capacity requirement for the fourth bitstream; and determining, based on the second and fourth indications, that a decoding capacity is enough to use a second decoder instance for decoding the second bitstream and a fourth decoder instance for decoding the fourth bitstream in parallel for decoding the second and the fourth bitstream.

5. The method according to claim 1, wherein the first spatial subset comprises a displayed picture.

6. An apparatus comprising at least one processor and memory including computer program code, the memory and the computer program code configured to, with the at least one processor, cause the apparatus to perform at least the following:

select a first bitstream from a set of multiple bitstreams with different viewing orientations, the first bitstream comprising a first spatial subset of coded pictures of a video content;

extract the first spatial subset from coded pictures of a first bitstream to form a second bitstream, wherein the first spatial subset covers content for display;

extract the second spatial subset from the coded pictures of the first bitstream to form a third bitstream, wherein the second spatial subset covers content for display with different viewing orientation than the first spatial subset;

generate a fourth bitstream by selecting and removing from the third bitstream a selected set of pictures comprising one or more pictures from the third bitstream, wherein the selection is performed in a manner that the selected set of pictures is not required for decoding any pictures of the fourth bitstream, wherein selecting and removing the selected set of pictures is performed from a set of temporal sub-layers;

decode the second bitstream for display; and decode the fourth bitstream for display with different viewing orientation than the first spatial subset.

7. The apparatus according to claim 6, wherein the first spatial subset is a first motion-constrained tile set and the second spatial subset is a second motion-constrained tile set.

8. The apparatus according to claim 6, further comprising computer program code configured to cause the apparatus to select the selected set of pictures as non-reference pictures of a highest temporal sub-layer.

9. The apparatus according to claim 6, further comprising computer program code configured to cause the apparatus to:

parse a second indication concerning a decoding capacity requirement for the second bitstream;

parse a fourth indication concerning a decoding capacity requirement for the fourth bitstream; and determine, based on the second and fourth indications, that a decoding capacity is enough to use a second decoder instance for decoding the second bitstream and a fourth decoder instance for decoding the fourth bitstream in parallel for decoding the second and the fourth bitstream.

10. The apparatus according to claim 6, wherein the first spatial subset comprises a displayed picture.

11. A computer program product embodied on a non-transitory computer readable medium, comprising computer program code configured to, when executed on at least one processor, cause an apparatus or a system to:

select a first bitstream from a set of multiple bitstreams with different viewing orientations, the first bitstream comprising a first spatial subset of coded pictures of a video content and a second spatial subset of coded pictures of a video content;

extract the first spatial subset from coded pictures of a first bitstream to form a second bitstream, wherein the first spatial subset covers content for display;

extract the second spatial subset from the coded pictures of the first bitstream to form a third bitstream, wherein the second spatial subset covers content for display with different viewing orientation than the first spatial subset;

generate a fourth bitstream by selecting and removing from the third bitstream a selected set of pictures comprising one or more pictures from the third bitstream, wherein the selection is performed in a manner that the selected set of pictures is not required for decoding any pictures of the fourth bitstream, wherein selecting and removing the selected set of pictures is performed from a set of temporal sub-layers;

decode the second bitstream for display; and decode the fourth bitstream for display with different viewing orientation than the first spatial subset.

12. The computer program product according to claim 11, wherein the first spatial subset is a first motion-constrained tile set and the second spatial subset is a second motion-constrained tile set.

13. The computer program product according to claim 11, further comprising computer program code configured to cause the computer program product to select the selected set of pictures as non-reference pictures of a highest temporal sub-layer.

14. The computer program product according to claim 11, further comprising computer program code configured to cause the computer program product to:

parse a second indication concerning a decoding capacity requirement for the second bitstream;

parse a fourth indication concerning a decoding capacity requirement for the fourth bitstream; and determine, based on the second and fourth indications, that a decoding capacity is enough to use a second decoder instance for decoding the second bitstream and a fourth decoder instance for decoding the fourth bitstream in parallel for decoding the second and the fourth bitstream.

15. The computer program product according to claim 11, wherein the first spatial subset comprises a displayed picture.

* * * * *